417-483
103
146
W. Race,
Oscillating Pump.
No. 267. A. I. Feb. 28, 1860.
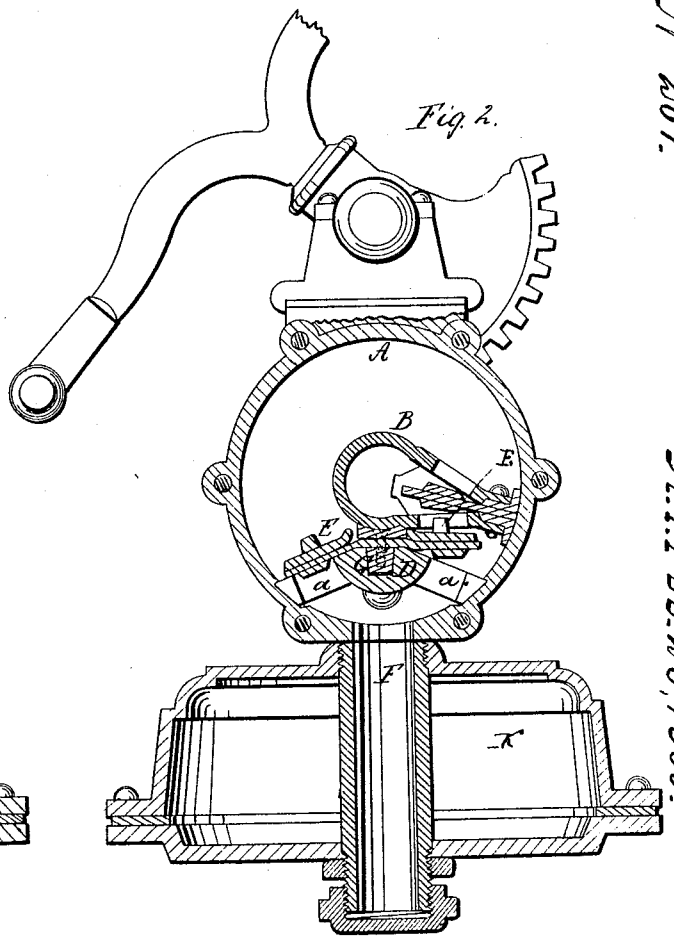
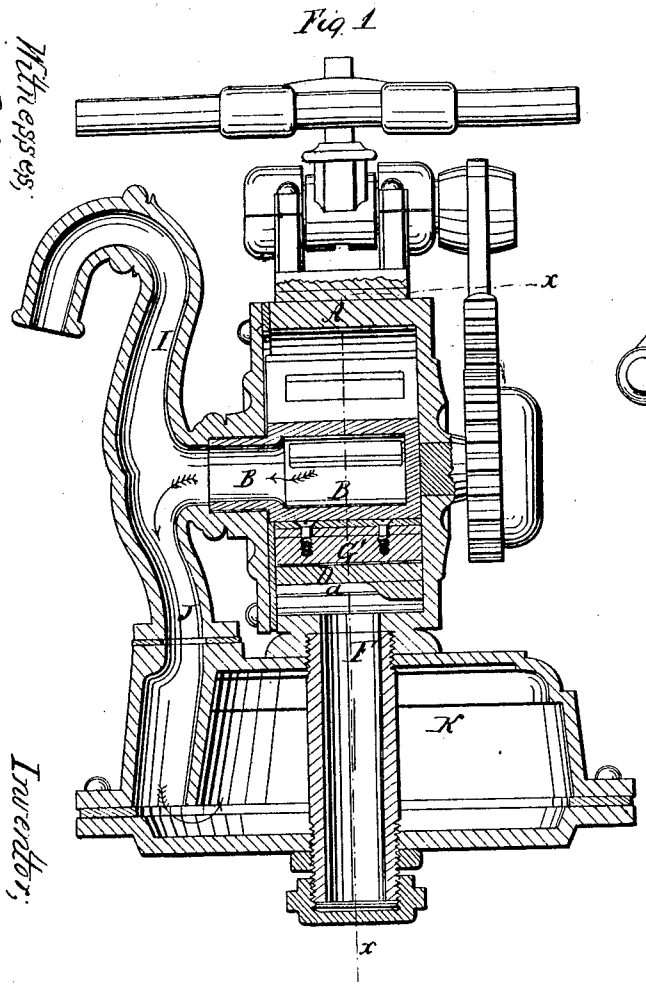
Witnesses;
S. R. C. Mathews
J. P. Race
Inventor;
Washburn Race
N. PETERS, PHOTO-LITHOGRAPHER, WASHINGTON, D. C.